Patented Apr. 14, 1925.

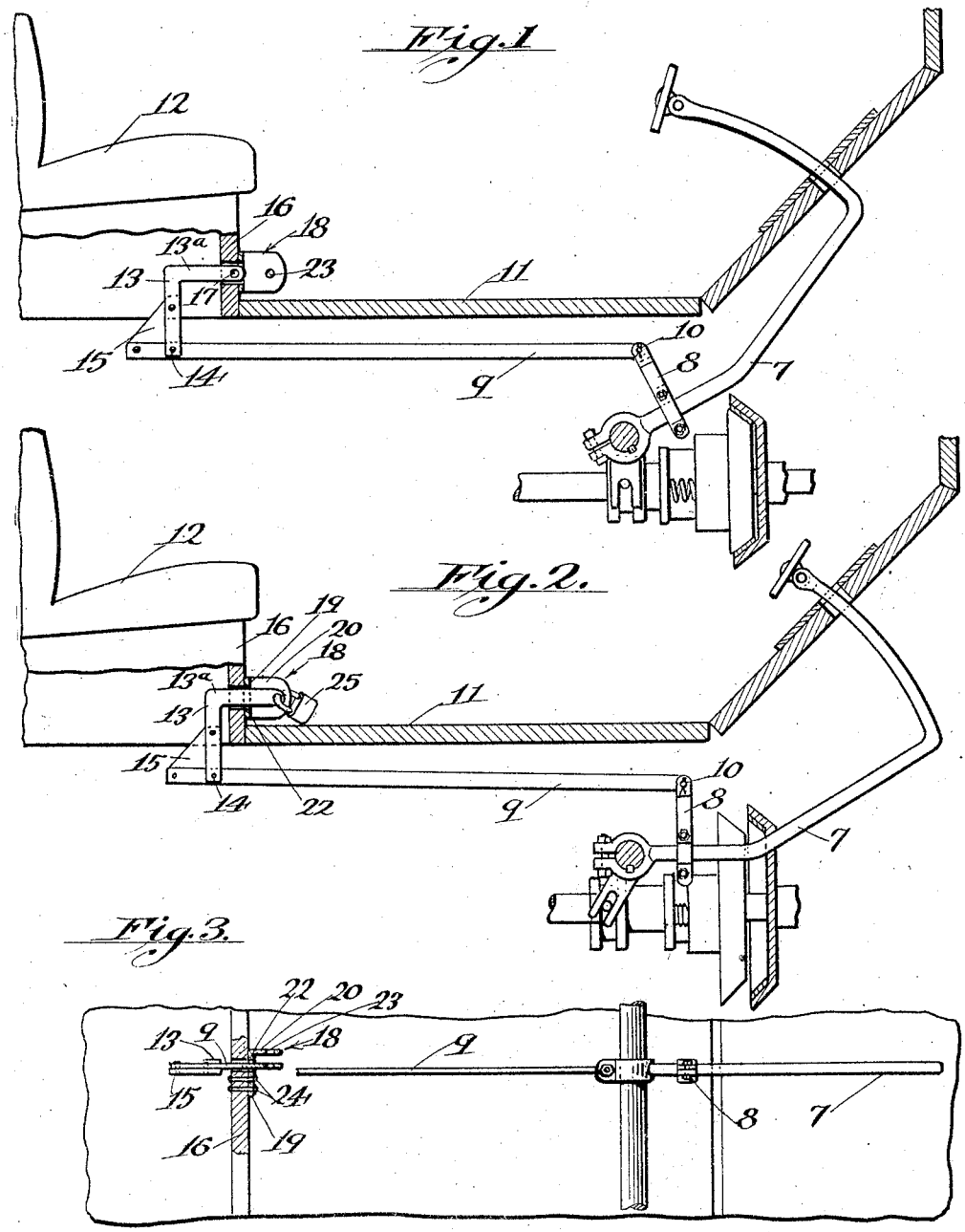

1,533,736

UNITED STATES PATENT OFFICE.

CHARLES F. HUMPHREY AND GERALD M. JEFFREY, OF PASADENA, CALIFORNIA.

CLUTCH LOCK FOR MOTOR VEHICLES.

Application filed May 5, 1924. Serial No. 711,124.

*To all whom it may concern:*

Be it known that we, CHARLES F. HUMPHREY, a citizen of the United States, and GERALD M. JEFFREY, a citizen of Canada, residing at Pasadena, in the county of Los Angeles and State of California, have invented new and useful Improvements in Clutch Locks for Motor Vehicles, of which the following is a specification.

This invention relates to locking mechanism, and more particularly it relates to means for locking the clutch lever of a motor vehicle.

An object of this invention is the provision of simple means for locking the clutch lever of an automobile.

Another object of this invention is the provision of mechanism whereby a clutch lever of an automobile may be locked when the members of a clutch are disengaged.

With the foregoing objects in view, together with such other objects and advantages as may subsequently appear, this invention consists in the construction and arrangement of parts hereinafter described and claimed and illustrated in the accompanying drawings, in which:

Figure 1 is a side elevation of the mechanism in relation to certain parts of the automobile, the mechanism being in unlocked position, Fig. 2 is a view similar to Fig. 1, showing the mechanism locked, Fig. 3 is a plan view of the locking mechanism shown in the previous figures, and Fig. 4 is a perspective view of a lug to which the mechanism of our invention may be locked.

Referring to the drawings for a more detailed description thereof, the numeral 7 indicates a clutch lever of conventional design, to which is secured a clamp 8. A link 9 is pivotally connected at 10 to the upper end of the clamp 8 and extends under the floor 11 of the automobile rearwardly to the driver's seat 12. An L-shaped member 13 is secured by fastening means 14 to the link 9. A triangular plate 15 is secured in any suitable manner to the link 9 and to the L-shaped member 13 to provide a rigid connection between the link and the L-shaped member. A horizontal portion 13$^a$ of the L-shaped member 13 extends forwardly and passes through an aperture in a seat support 16. An aperture 17 is formed in the free end of the horizontal portion 13$^a$ of the member 13.

A member 18, shown in Fig. 4, comprises a plate portion 19 and a lug 20. The plate portion 19 is provided with apertures 21 adapted to receive fastening means, and a slot 22. The lug 20 is provided with an aperture 23. The member 18 is secured to the seat support 16 by means of bolts 24 which pass through the apertures 21—the aperture 22 being in alignment with the aperture in the seat support 16 through which the horizontal portion 13$^a$ of the member 13 passes.

A padlock 25 passes through the aperture 17 of the member 14 and through the aperture 23 of the lug 20 to keep the lever 7 depressed and thereby to keep the clutch members in disengaged position. It will be understood that when the vehicle is running, the lock 25 is off and the horizontal portion 13$^a$ of the member 13 is free to move through the aperture in the seat support 16; and it will be understood that when the clutch lever 7 is in fully depressed position, the apertures 17 and 23 are in alignment so that the lock 25 may be passed through these apertures.

We have thus produced a clutch lock for motor vehicles comprising a clamp adapted to be attached to the clutch lever, a link pivotally connected to said clamp and extending under the floor of the motor vehicle, an L-shaped member secured to said link and extending upwardly under the seat of the motor vehicle and forwardly to the front of the seat, a lug secured to a support of the seat and a lock engaging said lug and said L-shaped member.

This invention has been described, but modifications thereof may be devised without departing from the spirit thereof, and it is to be understood that such modifications come within the scope of this invention.

What is claimed is:

A clutch lock for automobiles comprising a clamp adapted to be attached to the clutch lever, a link pivotally connected to said clamp and extending under the floor of the automobile, an L-shaped member secured to said link and extending upwardly under the seat of the automobile and forwardly to the front of the seat, a lug secured to a support of the seat and a lock engaging said lug and said L-shaped member.

In testimony whereof we have signed our names to this specification.

CHARLES F. HUMPHREY.
GERALD M. JEFFREY.